United States Patent [19]

Ishii et al.

[11] Patent Number: 5,283,553
[45] Date of Patent: Feb. 1, 1994

[54] SWITCH WITH PRE-ALARM MEANS

[75] Inventors: Kazuhiro Ishii; Kenzi Kimura, both of Fukuyama, Japan

[73] Assignee: Mitsubishi Denki Kabushiki Kaisha, Tokyo, Japan

[21] Appl. No.: 892,730

[22] Filed: May 29, 1992

Related U.S. Application Data

[63] Continuation of Ser. No. 375,984, Jul. 6, 1989, abandoned.

[30] Foreign Application Priority Data

Jul. 7, 1988 [JP] Japan ................................ 63-167686

[51] Int. Cl.$^5$ .............................................. G08B 21/00
[52] U.S. Cl. .................................... 340/664; 340/638; 340/657; 335/17
[58] Field of Search ............... 340/664, 662, 644, 638, 340/657; 335/17; 361/78, 87

[56] References Cited

U.S. PATENT DOCUMENTS

| | | | |
|---|---|---|---|
| 3,761,776 | 9/1973 | Willard | 335/17 X |
| 3,809,985 | 5/1974 | Krause et al. | 340/664 X |
| 4,335,437 | 6/1982 | Wilson et al. | 364/483 |
| 4,698,621 | 10/1987 | Masot | 340/638 X |
| 4,768,025 | 8/1988 | Vila-Masot | 340/638 |

FOREIGN PATENT DOCUMENTS

| | | |
|---|---|---|
| 3501353 | 7/1986 | Fed. Rep. of Germany . |
| 2497013 | 3/1984 | France . |
| 2564648 | 11/1985 | France . |
| 2584877 | 1/1987 | France . |

*Primary Examiner*—Jeffrey Hofsass
*Attorney, Agent, or Firm*—Burns, Doane, Swecker & Mathis

[57] ABSTRACT

In a switch with pre-alarm means having level adjusting apparatus (105a) of the pre-alarming and an indicator (103) for showing that value of current flowing on a load corresponds to the pre-alarm level, the level adjusting apparatus (105a) is adjusted with monitoring the indicator (103). When the indicator (103) is lighted, the value shown by level indicator (105b) of the level adjusting apparatus (105a) corresponds to actual value of the current flowing on the load at that time.

2 Claims, 5 Drawing Sheets

SWITCH WITH PRE-ALARM MEANS

This application is a continuation, of application Ser. No. 07/375,984, filed Jul. 6, 1989 now abandoned.

BACKGROUND OF THE INVENTION

1. Field of the Invention

The present invention relates to a switch with pre-alarm means for generating an alarm when an abnormal current flows through a breaker of the switch prior to an actual tripping operation of the breaker, and specially to a switch with pre-alarm means to be used for measuring an effective value of the current flowing in the breaker or in the load by using the pre-alarm function thereof.

2. Description of the Prior Art

For measuring the value of current flowing in breaker of a switch, an ammeter or a current transformer, which is clamped or disposed on electric power lines or breaker of the switch, has been conventionally used. In the conventional measurement, generally the peak value of the current has been measured. Also for specifically measuring the effective value of the current, a circuit for measuring the effective value needs to be provided on tripping circuit of the switch.

As mentioned-above, since a complex apparatus or means must be used in the conventional switch for measuring the current on the breaker or the load, there is a demand for measuring the current value flowing on the load easily without using such complex apparatus.

SUMMARY OF THE INVENTION

An object of the present invention is to provide an improved switch with pre-alarm means for measuring value of current flowing on load by using pre-alarm function included in the switch.

A switch with pre-alarm means in accordance with the present invention comprises:

pre-alarm means for generating an alarm when an abnormal current, which is above a predetermined level, flows in breaker of the switch previous to tripping of the breaker;

operation indicator means for indicating operation of the pre-alarm means, which is provided on outer face of housing of the switch to confirm the operation;

level adjusting means for adjusting the predetermined level within a range below a rated value of current, said level adjusting means being provided on outer face of the housing; and level indicator means for indicating the predetermined level.

The switch with pre-alarm means in accordance with the present invention is constructed as mentioned above, when a user operates the level adjusting means for reducing the level of the pre-alarm means gradually from the rated value of the current with monitoring the indication of the operation indicator, the operation indicator means alarms by, for example, lighting of an alarm lamp. The indication by the level indicator means corresponds to the value of the current flowing on the load at that time. Thereby, the value of the current flowing on the load can easily be measured.

DESCRIPTION OF THE PREFERRED EMBODIMENTS

A preferred embodiment of a switch with pre-alarm means in accordance with the present invention is described referring to FIGS. 1, 2, 3, 4 and 5.

Figure 1:
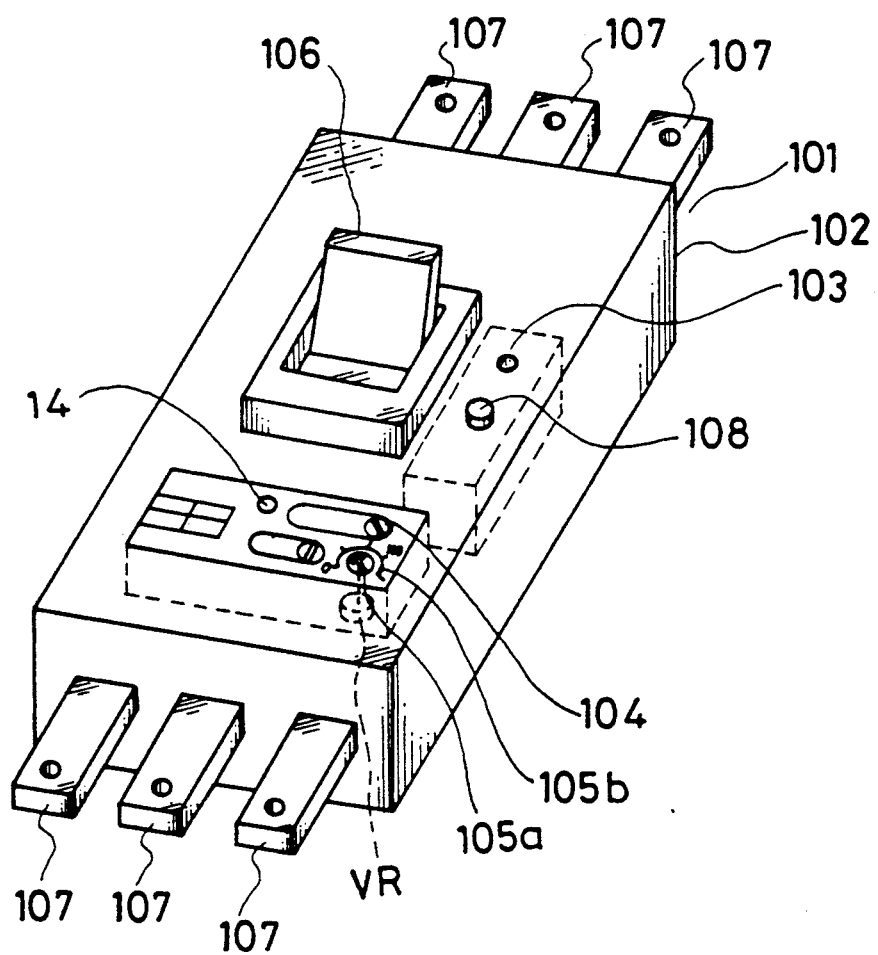
FIG. 1 is a perspective view for showing a preferred embodiment of a switch with pre-alarm means in accordance with the present invention.

FIG. 1 is a perspective view showing a switch with pre-alarm means in accordance with the present invention. In FIG. 1, the switch 101 comprises a breaker and a pre-alarm apparatus in a housing 102. An operation indicator 103 which is, for example, a light emitted diode (LED) is provided on outer face of the housing 102, thereby an operator can easily confirm the operation indicator 103. A reset switch 108 is also provided on the outer face of the housing 102. A lug 104 is for changing rated value for current of the switch 101, and lug 105a is for adjusting level of the pre-alarm of the switch. The lug 105a is rotatable and co-axially connected to a variable resistor such as $VR_1$ shown in FIG. 4, and thereby the level of the pre-alarm for lighting the operation indicator 103 is serially adjusted in a predetermined range for example 70–100% of the rated value of the current of the switch 101. A level indicator 105b such as scale for current (A) is provided around the lug 105a, thereby the level of the pre-alarm can be confirmed.

Furthermore, numeral 106 designates an operation lever of the breaker installed in the housing 102 for making and breaking contacts thereof; and numerals 107, 107... designate terminals of the switch 101 to be connected to electric power lines and loads.

Figure 3:
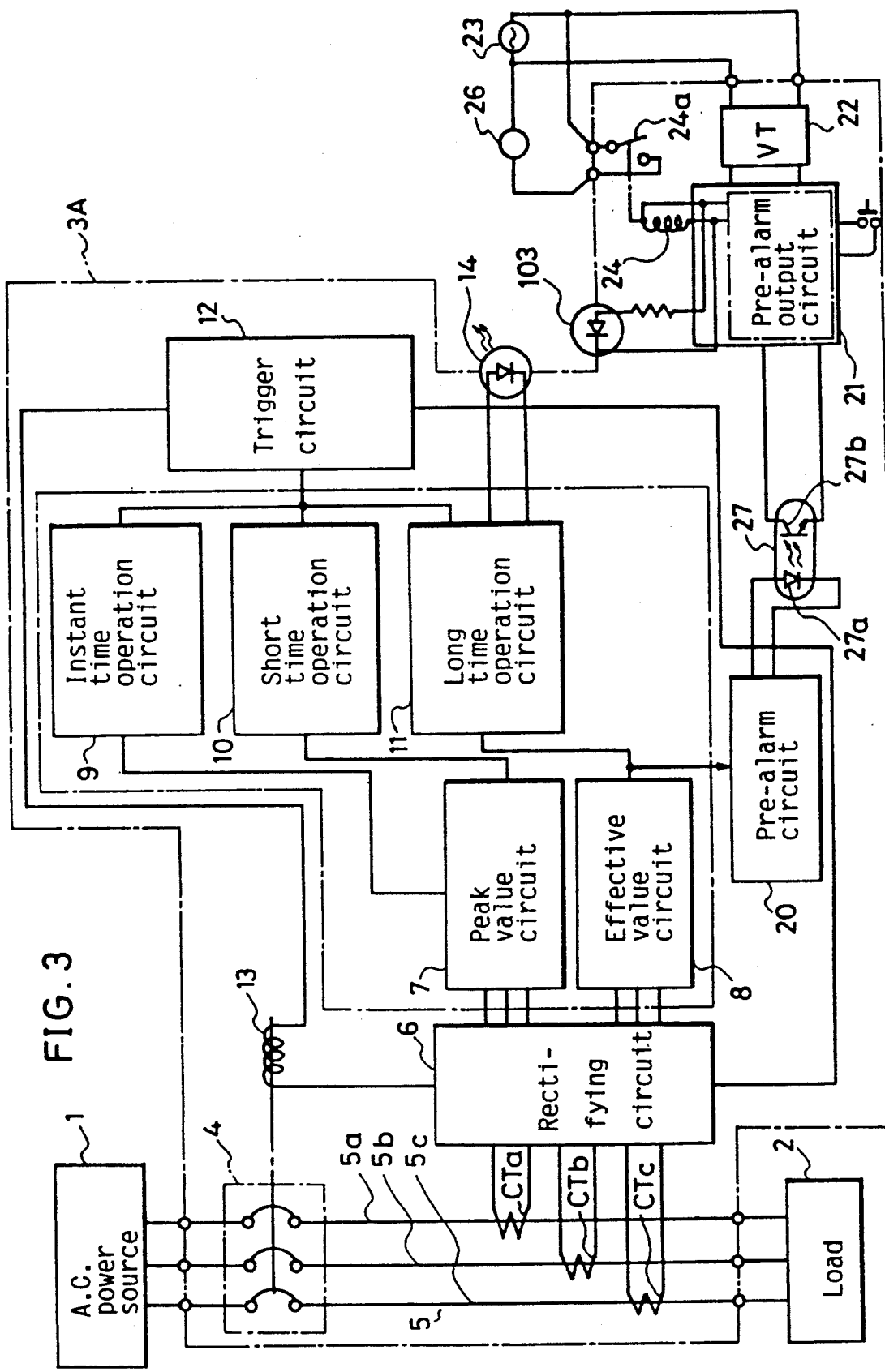
FIG. 3 is a circuit diagram of the switch with pre-alarm means in accordance with the present invention.

FIG. 3 is a circuit diagram of the switch with pre-alarm means in accordance with the present invention. In FIG. 3, current transformers CTa, CTb and CTc are disposed on three phases of A.C. power lines 5a, 5b and 5c, respectively. Output of secondary windings of the current transformers CTa, CTb and CTc are inputted to a rectifying circuit 6. Outputs of the rectifying circuit 6 is inputted to a peak value circuit 7 and an effective value circuit 8. The peak value circuit 7 selects an output from the rectifying circuit 6 corresponding to an output of the current transformers CTa, CTb and CTc including maximum value and converting the output to a peak value. The effective value circuit 8 also selects an output from the rectifying circuit 6 including maximum value and converting the output to an effective value. Output of the peak value circuit 7 is inputted to an instant time operation circuit 9 and a short time operation circuit 10. Output of the effective value circuit 8 is inputted to a long time operation circuit 11 and a pre-alarm circuit 20.

The instant time operation circuit 9, the short time operation circuit 10 and the long time operation circuit 11 are connected to a trigger circuit 12, respectively. The trigger circuit 12 is connected to a tripping coil 13 and the rectifying circuit 6. The other terminal of the tripping coil 13 is also connected to the rectifying circuit 6. A light emitting diode (LED) 14 for indicating occurrence of over-current is connected to the long time operation circuit 11. The pre-alarm circuit 20 is connected to a pre-alarm output circuit 21 via photocoupler 27. A light emitting diode (LED) 103 for pre-alarming and a relay coil 24 for pre-alarming are connected to the pre-alarm output circuit 21. An electric power source 23 for controlling the switch 101 is connected to the pre-alarm output circuit 21 via a voltage dropping element 22 such as a voltage transformer (VT). An alarm buzzer 26 is connected to the power source 23 via switch 24a. The switch 24a is opened and closed by operation of the relay coil 24 for pre-alarming, thereby the alarm buzzer 26 is controlled.

Figure 4:
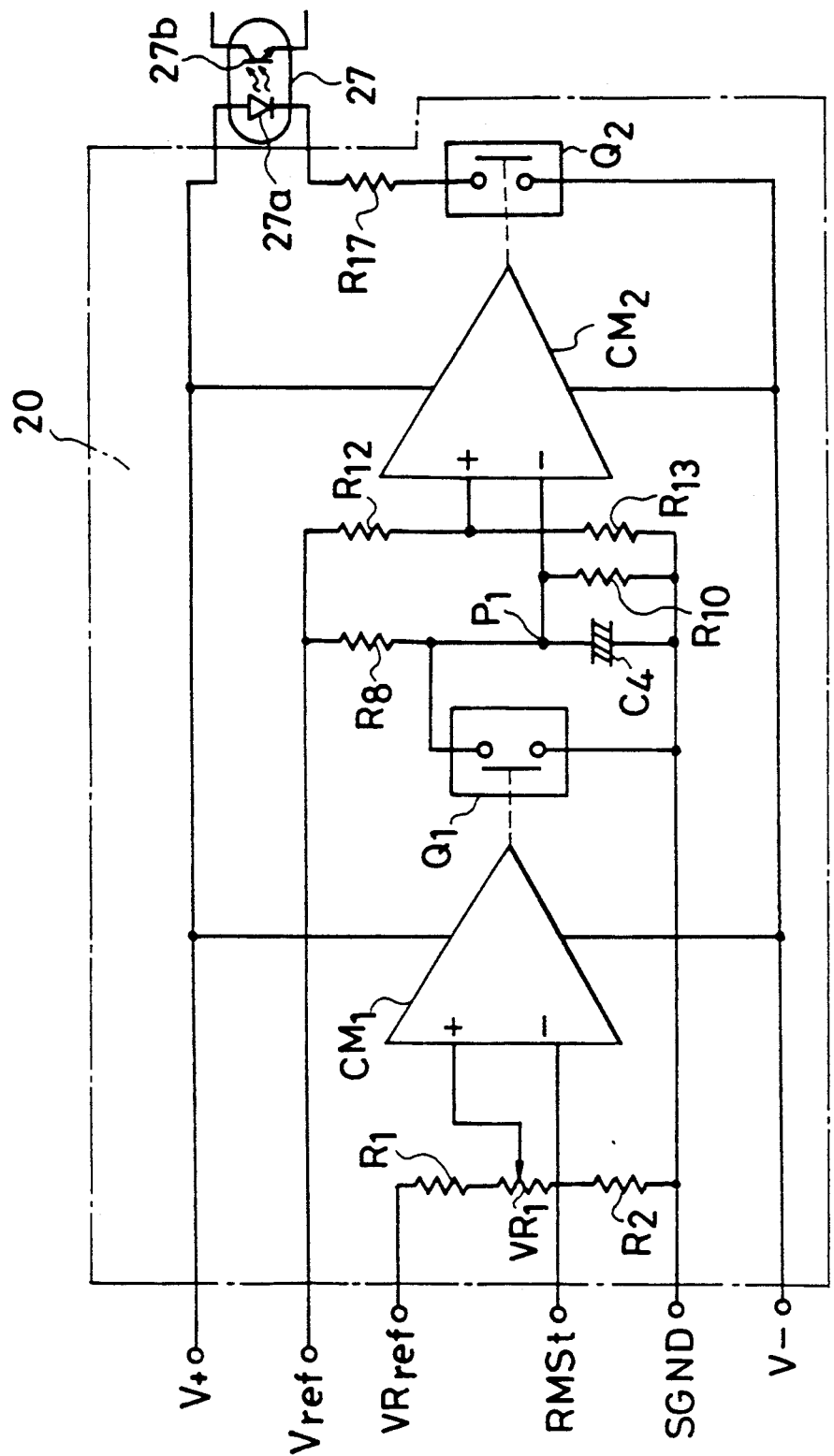
FIG. 4 is a circuit diagram showing details of the pre-alarm circuit 20 shown in FIG. 3.

FIG. 4 is a circuit diagram for showing details of the pre-alarm circuit 20 in FIG. 3. In FIG. 4, terminals designated by V+, V− and SGND are respectively connected to an electric power source of an over-current tripping circuit which is not shown in the drawings because they are well known in the art. $V_{ref}$ is a reference voltage, which is kept, for example, at 4 V. Voltage at a terminal designated by $VR_{ref}$ is changeable due to the rated value of the current and set at, for example, 4 V when the rated value is 400 A and set at 2 V when the rated value is 200 A. Non-inverted terminal of a first comparator $CM_1$ is connected to a variable resistor $VR_1$ and voltage thereof is changed by the setting of the variable resistor $VR_1$. The variable resistor $VR_1$ is used for setting the pre-alarm level of the value of the current, and co-axially provided on the lug 105a shown in FIG. 1.

A D.C. signal, which is in proportion to the effective value of the current flowing in a main circuit, for example, electric power line 5a, 5b or 5c is applied to a terminal designated by $RMS_t$. Signals on the terminal designated by RMST are the output of the effective value circuit 8. When the level of the D.C. signal on the terminal of $RMS_t$ is above the reference voltage $V_{ref}$ of the first comparator $CM_1$, a switch $Q_1$ is turned off from an on state. Non-inverted terminal of a second comparator $CM_2$ is inputted to a reference voltage divided by resistors $R_{12}$ and $R_{13}$. Inverted terminal of the second comparator $CM_2$ is connected to a point $P_1$ which is a connecting point of resistors $R_8$ and $R_{10}$ connected between $V_{ref}$ and SGND in series. A capacitor $C_4$ is connected to the resistor $R_{10}$ in parallel.

At first, since the switch $Q_1$ is turned on state, the input of the inverted terminal of the second comparator $CM_2$ is "0". When the switch $Q_1$ turns off, the resistor $R_8$ and the capacitor $C_4$ start a timing operation and the voltage of the capacitor $C_4$ is gradually raised. When the voltage of the capacitor $C_4$ reaches the reference voltage of the second comparator $CM_2$, a switch $Q_2$ connected to the second comparator $CM_2$ turns on and a current flow to the photo-coupler 27 via resistor $R_{17}$. As a result, a signal is output to the pre-alarm output circuit 21.

Figure 5:
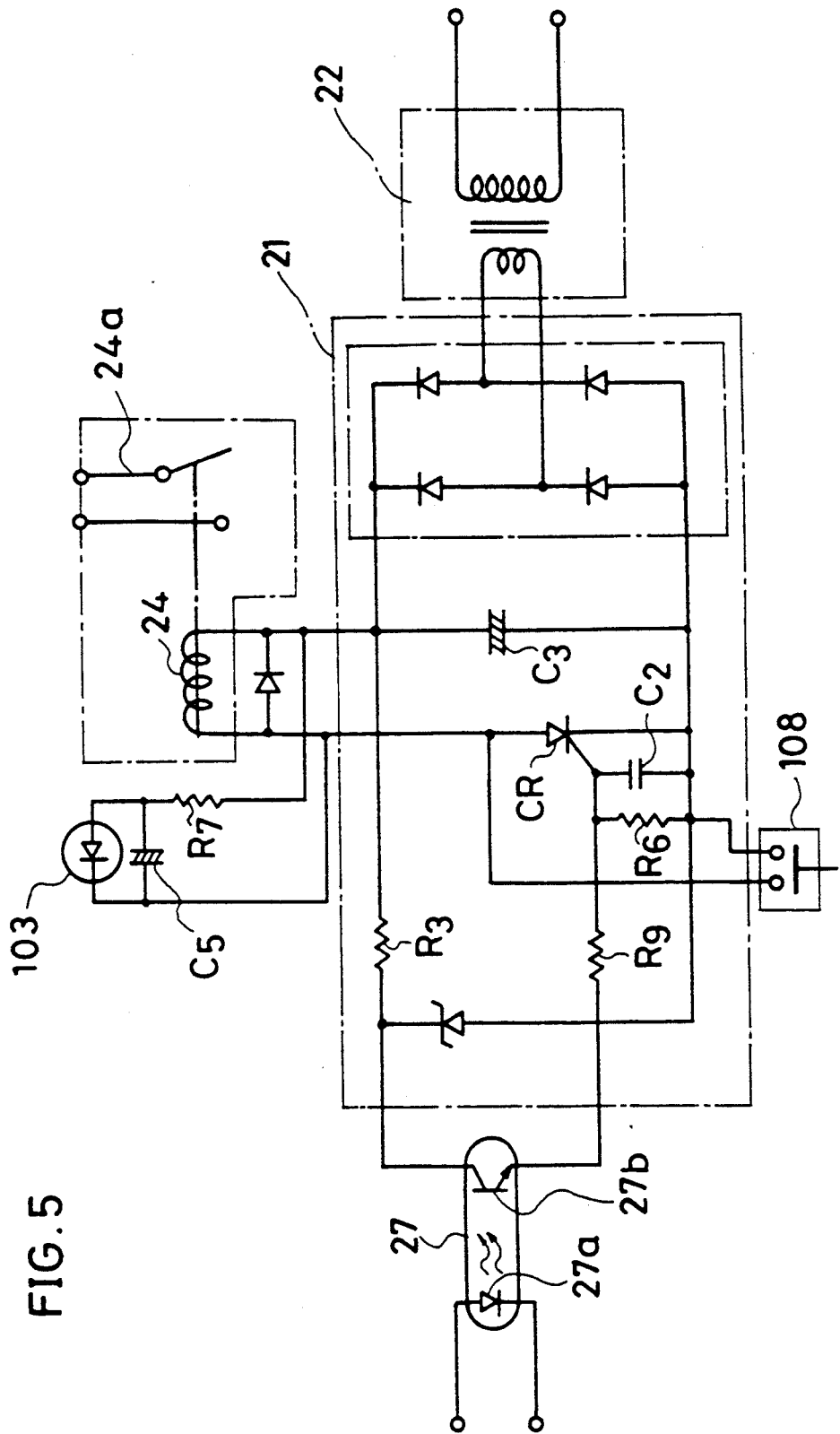
FIG. 5 is a circuit diagram showing details of a pre-alarm output circuit 21 shown in FIG. 3.

FIG. 5 is in a circuit diagram showing details of the pre-alarm output circuit 21. In FIG. 5, when LED 27a is lighted by flow of output signal from the pre-alarm circuit 20, photo-transistor 27b of the photo-coupler 27 turns on. When the photo-transistor 27b turns on, current flows to gate of thyristor CR via resistor $R_3$, transistor 27b and resistor $R_9$. When the thyristor CR turns on, current flows on the relay coil 24 and switch 24a is turned on by electro-magnetic force of the relay coil 24. Since the alarm buzzer 26 is connected in series to the switch 24a as shown in FIG. 3, when the normal open switch 24a is turned on the alarm buzzer 26 is driven. At the same time, the operation indicator (LED) 103 for pre-alarming is lighted. A smoothing capacitor $C_3$ of FIG. 5 is for smoothing full-wave rectified current and a capacitor $C_5$ is for preventing erroneous lighting of the operation indicator (LED) 103 due to large-over current of the main circuit.

Figure 2:
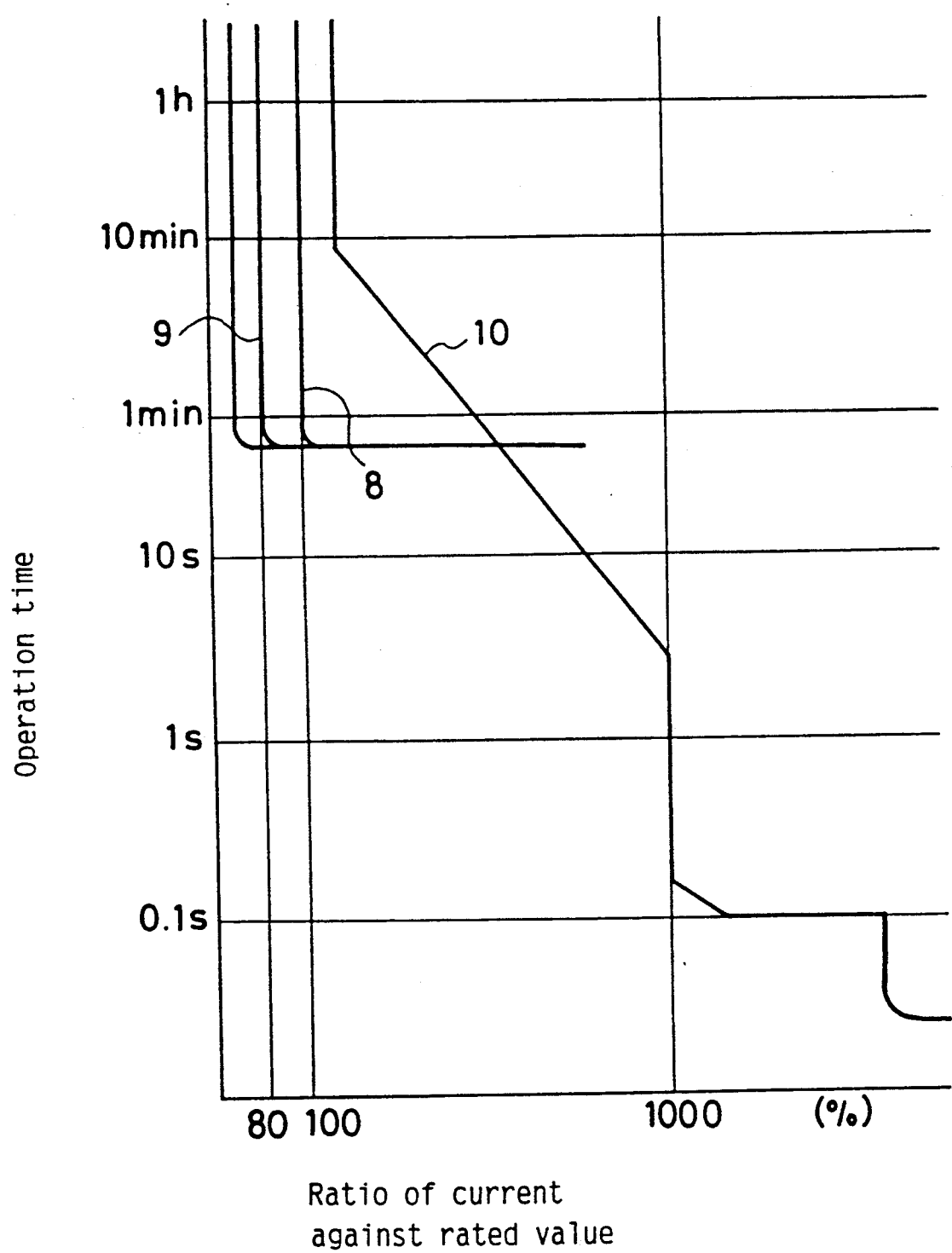
FIG. 2 is a drawing for showing time-current characteristics of pre-alarm and over-current tripping operations of the switch with pre-alarm means in accordance with the present invention.

In the above-mentioned embodiment, for measuring the value of the current flowing on the main circuit (or the breaker disposed on the main power line), the lug 105a for adjusting level of the pre-alarm of the switch 101 is to be turned with monitoring the operation indicator (LED) 103. In FIG. 2, for example, the level of the pre-alarm is gradually reduced from the rated value of current designated by numeral 8. When the operation indicator (LED) 103 is lighted at a position on the line 9, the value on the line 9 shows the value of the current flowing on the load. In this embodiment, the line 9 shows ratio of 80% of the current rated value of the current shown by line 8. When the rated value of the current is 150A, the actual value of the current flowing on the load is 120A. In FIG. 2, line 10 shows the characteristics of the over-current tripping of the breaker.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A switch providing a pre-alarm function and current measurement function, comprising:
   pre-alarm means for generating a signal when a current above a predetermined level flows through a breaker of said switch previous to tripping of said breaker;
   operation indicator means having two states, responsive to said pre-alarm means, for indicating existence of said signal;
   level adjusting means for adjusting said predetermined level within a range below a rated value of current such that, when said adjusting means adjusts said predetermined level to traverse the present level of current flowing in said breaker, said indication of said operation indicator means changes state; and
   a scale positioned adjacent said level adjusting means for indicating said predetermined level as a percentage of a rated value of current.

2. A switch providing a pre-alarm function and a current measurement function, comprising:
   at least one current transforming means provided on at least one electric power line for outputting an electric current corresponding to a value of current flowing through said electric power line;
   at least one maximum value detecting means for detecting the maximum value of said electric current of said current transforming means and outputting said maximum value;
   pre-alarm judging means for comparing said maximum value with a predetermined alarm level and outputting a first signal when said maximum value is above said predetermined alarm level;
   alarm level adjusting means for adjusting said predetermined alarm level throughout a predetermined range;
   alarm indicating means having two states for indicating that said maximum value is equal to or greater than said predetermined alarm level by receiving said first signal from said pre-alarm judging means such that, when said alarm level adjusting means adjusts said predetermined alarm level to traverse said maximum value, said indication of alarm indicating means changes state thus acting as a current level detection device; and a scale positioned adjacent said alarm level adjusting means for indicating a value of said alarm level as a percentage of a rated value of current.

* * * * *